United States Patent
Sugawara

(10) Patent No.: US 10,763,480 B2
(45) Date of Patent: Sep. 1, 2020

(54) POROUS SEPARATOR FOR SECONDARY BATTERIES AND SECONDARY BATTERY USING SAME

(71) Applicant: Tokyo Ohka Kogyo Co., Ltd., Kanagawa (JP)

(72) Inventor: Tsukasa Sugawara, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 273 days.

(21) Appl. No.: 15/124,528

(22) PCT Filed: Mar. 12, 2015

(86) PCT No.: PCT/JP2015/057357
§ 371 (c)(1),
(2) Date: Sep. 8, 2016

(87) PCT Pub. No.: WO2015/137461
PCT Pub. Date: Sep. 17, 2015

(65) Prior Publication Data
US 2017/0018749 A1    Jan. 19, 2017

(30) Foreign Application Priority Data

Mar. 14, 2014 (JP) ................... 2014-052610
Mar. 31, 2014 (JP) ................... 2014-073988
Oct. 21, 2014 (JP) ................... 2014-214308

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/1653* (2013.01);
(Continued)

(58) Field of Classification Search
CPC .. H01M 2/1686; H01M 2/1653; H01M 2/145; H01M 4/13; H01M 10/052; H01M 10/0525
See application file for complete search history.

(56) References Cited

U.S. PATENT DOCUMENTS 8,815,435 B2    8/2014 Nishikawa
2003/0118896 A1    6/2003 Yamaguchi et al.
(Continued)

FOREIGN PATENT DOCUMENTS

JP    2002-279956    9/2002
JP    2002-319386    10/2002
(Continued)

OTHER PUBLICATIONS

Machine translation of Japanese Patent Publication No. JP 2002-279956 (Year: 2002).*

(Continued)

*Primary Examiner* — Miriam Stagg
*Assistant Examiner* — Lilia Nedialkova
(74) *Attorney, Agent, or Firm* — Wenderoth, Lind & Ponack, L.L.P.

(57) ABSTRACT

A porous separator for secondary batteries is formed of a porous film, and has a first layered region having an average pore diameter of 100 nm or more and 500 nm or less, and a second layered region having a larger average pore diameter than the first layered region. The first layered region is positioned in one outermost surface of the porous film. Both the first layered region and the second layered region may be positioned as outermost surfaces of the porous film.

18 Claims, 2 Drawing Sheets

(51) Int. Cl.
*H01M 10/0525* (2010.01)
*H01M 10/052* (2010.01)
*H01M 4/13* (2010.01)

(52) U.S. Cl.
CPC .......... *H01M 10/0525* (2013.01); *H01M 4/13* (2013.01); *H01M 10/052* (2013.01)

(56) References Cited

U.S. PATENT DOCUMENTS

| | | |
|---|---|---|
| 2004/0053122 A1 | 3/2004 | Sugiyama et al. |
| 2004/0115523 A1 | 6/2004 | Hommura et al. |
| 2006/0046149 A1 | 3/2006 | Yong et al. |
| 2006/0222936 A1* | 10/2006 | Yamaguchi ......... H01M 2/1653 429/145 |
| 2011/0143185 A1 | 6/2011 | Nishikawa |
| 2011/0318556 A1 | 12/2011 | Ohya et al. |
| 2012/0251869 A1 | 10/2012 | Lee et al. |
| 2014/0186681 A1 | 7/2014 | Lee et al. |
| 2014/0329130 A1* | 11/2014 | Kanamura ............ H01M 2/145 429/144 |
| 2015/0050542 A1 | 2/2015 | Mizuno et al. |
| 2015/0072219 A1 | 3/2015 | Less et al. |
| 2015/0125737 A1* | 5/2015 | Arora ....................... H01G 9/02 429/145 |

FOREIGN PATENT DOCUMENTS

| | | |
|---|---|---|
| JP | 2004-146190 | 5/2004 |
| JP | 3680759 | 8/2005 |
| JP | 2008-166212 | 7/2008 |
| JP | 2010-537387 | 12/2010 |
| JP | 2012-14914 | 1/2012 |
| JP | 2012-43762 | 3/2012 |
| JP | 2012-216331 | 11/2012 |
| JP | 2013-109842 | 6/2013 |
| JP | 2013-109843 | 6/2013 |
| JP | 2013-543634 | 12/2013 |
| KR | 10-2013-0105180 | 9/2013 |
| WO | 2010/021248 | 2/2010 |
| WO | WO-2013084368 A1 * | 6/2013 |
| WO | 2013/146402 | 10/2013 |

OTHER PUBLICATIONS

Arora, P. and Z. Zhang, "Battery Separators", Chem. Rev., 104, pp. 4419-4462, published Oct. 13, 2004. (Year: 2004).*
Office Action dated Oct. 24, 2017 in European Application No. 15762145.9.
European Search Report dated Feb. 27, 2017 in corresponding European Application No. 15762145.9.
International Search Report dated May 19, 2015 in International (PCT) Application No. PCT/JP2015/057357.

* cited by examiner

POROUS SEPARATOR FOR SECONDARY BATTERIES AND SECONDARY BATTERY USING SAME

TECHNICAL FIELD

The present invention relates to a porous separator for secondary batteries and a secondary battery using the same.

BACKGROUND ART

In recent years, along with reductions in sizes of portable electronic devices and with development of hybrid automobiles, electric automobiles, etc. giving consideration to environmental problems such as atmospheric pollution and carbon dioxide increase, there is an increasing demand for secondary batteries applicable to such electronic devices and electric automobiles having excellent characteristics such as high efficiency, high output, high energy density, and light weight. Various studies have been conducted for providing a secondary battery having such required characteristics.

For example, a lithium-ion secondary battery usually has a structure in which a space between a positive electrode (cathode) and a negative electrode (anode) is filled with an electrolytic solution composed of a lithium salt, such as $LiPF_6$, dissolved in a non-aqueous organic solvent. Lithium transition metal oxide is used as the positive electrode, and lithium or carbon (graphite) is mainly used as the negative electrode. The electrolytic solution has superior ionic conductivity and negligible electrical conductivity. During charging, lithium ions move from the positive electrode to the negative electrode, and during discharging, lithium ions move in the reverse direction.

The positive electrode and the negative electrode of the lithium-ion secondary battery are separated from each other with a separator formed of a porous polymer film and are in a structure preventing their direct electric contact. Accordingly, the separator for a secondary battery is required to have various characteristics, such as film thickness (thinness), mechanical strength, ionic conductance (during containing of an electrolytic solution), electric insulation, electrolytic solution resistance, electrolytic solution-retaining property, and wettability. As the separator for a secondary battery having these properties, a porous film made of polyolefins, such as polyethylene and polypropylene, is generally used. Porous films have random pores at a porosity of about 35% to 40% are widely used as separators for lithium-ion secondary batteries having negative electrodes of carbon.

It is known that in the case of using these conventionally known porous separators, lithium metal is deposited on negative electrodes after repeated charge and discharge cycles. Furthermore, the repetition of charge and discharge of a battery is known to cause the growth of dendrite lithium, resulting in a short circuit of the battery and this problem needs to be solved (Patent Document 1).

In addition, the separator itself is also known to deposit ions of the metal constituting the positive electrode due to the pore diameter distribution, inhibiting ion transfer in the electrolytic solution and causing the growth of dendrite, resulting in a short circuit of the battery (Patent Document 2). On the other hand, a separator having few large diameter pores and having a uniform pore diameter has a problem of increase in manufacturing cost, and a separator having large diameter pores suffers from a lack of mechanical strength leading to a problem of deterioration in handling properties.

Patent Document 1: Japanese Unexamined Patent Application (Translation of PCT Application), Publication No. 2010-537387

Patent Document 2: Japanese Unexamined Patent Application, Publication No. 2008-166212

DISCLOSURE OF THE INVENTION

Problems to be Solved by the Invention

The present invention has been made in view of the abovementioned circumstances and an objective of the present invention is to provide a porous separator that is superior in handling properties and that gives superior electric properties to a secondary battery.

Means for Solving the Problems

The present inventors have found that using a porous film, which includes a first laminar region having a predetermined average pore diameter and a second laminar region having an average pore diameter larger than that of the first laminar region, as a porous separator can improve the handling properties of the porous separator and performance of a battery employing the porous separator, leading to completion of the present invention.

A first aspect of the present invention is a porous separator for secondary batteries, the separator being formed of a porous film, characterized in that: a first laminar region has an average pore diameter of 100 nm or more and 500 nm or less; and a second laminar region has an average pore diameter larger than that of the first laminar region, wherein the first laminar region is positioned as one outermost surface of the porous film.

A second aspect of the present invention is a secondary battery, characterized in that: an electrolytic solution and the porous separator for secondary batteries according to any one of claims 1 to 3 are disposed between a negative electrode and a positive electrode; and the first laminar region of the porous separator for secondary batteries is disposed in the negative electrode side.

In another aspect of the present invention, the second laminar region in the first aspect may have a laminar region having a maximum pore diameter larger than an average pore diameter of the first laminar region. Yet another aspect of the present invention is a porous separator for secondary batteries, the separator being formed of a porous film, characterized in that: a first laminar region has an average pore diameter of 100 nm or more and 500 nm or less; and a second laminar region has a maximum pore diameter larger than an average pore diameter of the first laminar region, wherein the first laminar region is positioned as one outermost surface of the porous film.

Effects of the Invention

The present invention can provide a porous separator that is superior in handling properties and that gives superior electric properties to a secondary battery.

PREFERRED MODE FOR CARRYING OUT THE INVENTION

Figure 1:
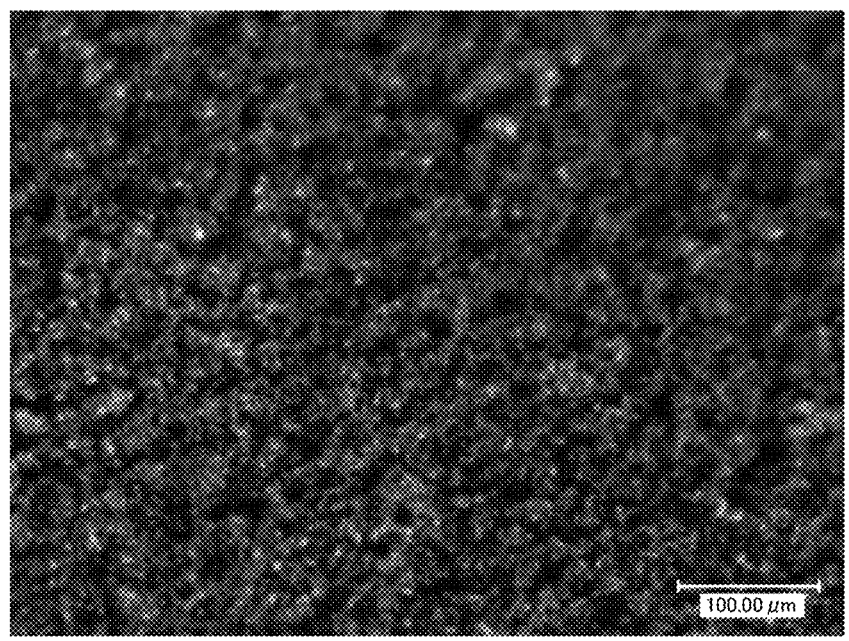
FIG. 1 is a diagram illustrating a negative electrode surface of a secondary battery employing a separator according to the present invention, after a charge/discharge test.

Embodiments of the present invention will now be described in detail, but the present invention is not limited to the following embodiments and can be implemented with appropriate modifications within the purpose of the present invention.

Porous Separator for Secondary Batteries

A porous separator for secondary batteries according to the first aspect of the present invention is a porous separator for secondary batteries being formed of a porous film, characterized in that: a first laminar region has an average pore diameter of 100 nm or more and 500 nm or less; and a second laminar region has an average pore diameter larger than that of the first laminar region, in which the first laminar region is positioned as one outermost surface of the porous film.

Two principal surfaces of the porous film constituting the separator have a large number of apertures of pores communicating with each other inside the film. A region on, and in the vicinity of, a principal surface of the porous film that is oriented toward the negative electrode of the secondary battery, extending on an outermost surface and therebeneath in a layer-like manner, is referred to as a first laminar region. An average diameter of the pores present in this region is considered as an average pore diameter of the first laminar region. Some of the pores have apertures on the surface, and some communicate with other pores inside the film.

The porous film of the present invention has a second laminar region that extends substantially parallel to the first laminar region, at a predetermined distance away from the outermost surface, where the first laminar region is formed, toward another outermost surface, in a cross-sectional view. The second laminar region also has a plurality of pores, and an average pore diameter thereof is larger than that of the first laminar region.

The first laminar region and the second laminar region may be adjacent to each other or may have another region therebetween. These regions may or may not have a defined border therebetween. Furthermore, both the first laminar region and the second laminar region may be positioned as outermost surfaces of the porous film.

The total thickness of the porous film of the present invention is not particularly limited and is preferably 5 μm or more and 500 μm or less, more preferably 10 μm or more and 100 μm or less, and most preferably 10 μm or more and 30 μm or less. The abovementioned thickness can be determined by, for example, measuring the thicknesses of a plurality of positions with a micrometer or the like and averaging the thicknesses. The first laminar region according to the present invention preferably has a thickness of 0.3 μm or more and 5 μm or less, preferably 0.4 μm or more and 4 μm or less, and more preferably 0.5 μm or more and 3 μm or less; and the second laminar region preferably has a thickness of 4.3 μm or more and 500 μm or less, preferably 4.5 μm or more and 99.7 μm or less, and more preferably 5 μm or more and 29.7 μm or less. The thickness of each laminar region can be calculated by averaging thicknesses at a plurality of positions in the first and second laminar regions of a cross section of a porous film observed with, for example, a scanning electron microscope (SEM).

The average pore diameter in the first laminar region of the porous film is required to be 100 nm or more and 500 nm or less, preferably 100 nm or more and 400 nm or less, and more preferably 100 nm or more and 300 nm or less. The average pore diameter in the first laminar region being 100 nm or more can secure sufficient metal ion conductivity via the electrolytic solution inside the separator, and the average pore diameter being 500 nm or less can avoid electric field concentration and suppress deposition of metal on the separator, thus preventing generation of dendrite.

The average pore diameter in the second laminar region is not particularly limited as long as it is larger than the average pore diameter in the first laminar region, and is preferably 1200 nm or less, and more preferably 800 nm or less. There is no particular lower limit for the average pore diameter in the second laminar region; however, the average pore diameter is preferably larger than 250 nm, more preferably larger than 500 nm, and further more preferably larger than 600 nm. The average pore diameter in the second laminar region being larger than the average pore diameter in the first laminar region can increase strength of the porous film constituting the porous separator and can improve handling properties thereof. The average pore diameter in the second laminar region being larger than 250 nm, or particularly larger than 500 nm, can secure sufficient metal ion conductivity through the pores in the separator, and the average pore diameter being 1200 nm or less allows production of a porous separator with densely populated apertures on a principal surface thereof.

The maximum pore diameter in the second laminar region is preferably 2500 nm or less, more preferably 300 to 2000 nm, and further more preferably 500 to 1500 nm. A difference between the maximum pore diameter in the second laminar region and the average pore diameter in the first laminar region is preferably 100 nm or greater, more preferably 200 to 2500 nm, and further more preferably 500 to 2000 nm.

A difference between the average pore diameter in the first laminar region and the average pore diameter in the second laminar region is not particularly limited, and is preferably 100 nm or greater, more preferably 200 nm or greater, and most preferably 350 nm or greater. The upper limit is not particularly limited, and is for example 1000 nm or less.

It should be noted that, as another aspect of the present invention, in a case in which the second laminar region has a laminar region having a maximum pore diameter larger than the average diameter of the first laminar region, a difference between the average pore diameter in the first laminar region and the average pore diameter in the second laminar region is preferably 0 nm or more and 1000 nm or less, and more preferably 0 nm or more and 700 nm or less.

The porous film of the present invention can be produced by removing, from a precursor film containing fine particles, the fine particles. Given this, in a case in which surface treatment by chemical etching and the like (described later) does not take place, the average pore diameter of the first laminar region is equal to the average particle diameter of the fine particles contained in a region of the precursor film corresponding to the first laminar region. Alternatively, the average pore diameter can be calculated by measuring pore diameters at a plurality of positions in the first laminar region of a cross section of the porous film of the present invention observed with, for example, a scanning electron microscope (SEM). The pore diameter and the maximum pore diameter of the second laminar region can also be calculated in a similar manner to the first laminar region.

On the other hand, the surface treatment by chemical etching and the like extends a diameter of a pore having its aperture on the outermost surface of the porous film, and therefore the average pore diameter in the region tends to be larger than the average diameter of the fine particles contained in the precursor film. In this case, the average diameter may be obtained by image analysis of a cross-sectional SEM image; however, it is more preferable to use a porosimeter (mercury intrusion method) or a porometer (bubble point method). An actual average pore diameter can be obtained based on size variation of interconnected pores after the treatment obtained by the porosimeter or the porometer. More specifically, a variation amount of the average particle diameter of the fine particles used (average pore diameter) is estimated from a variation amount of the interconnected pores, and an actual average pore diameter is obtained. As used herein, the interconnected pore means a hole at a joint of pores formed by removing adjacent fine particles in the precursor film by a selected appropriate method.

A size of the interconnected pore can be obtained by using the porometer according to the following formula.

$$d = C\gamma/P$$

wherein d is the size of the interconnected pore (µm), $\gamma$ is surface tension of a liquid (mN/m), P is pressure (kg/cm$^2$), and C is a constant. The constant C is 0.415 in a case in which a unit for pressure is psi. The bubble point method employs a principle that, when a porous separator soaked with a liquid is pressurized with air, the air can pass therethrough if the air pressure applied is greater than a capillary tension of the liquid in a pore; and thus a smaller pore (e.g. interconnected pore) requires a greater pressure. Comparing gas flow rate under the same pressure between a wet porous separator and a dry porous separator allows calculation of a proportion of a flow rate through the holes having at least a particular size in the porous separator based on a relationship between the pressure and the pore size; and gradually increasing the pressure also allows determination of a flow rate distribution of extremely small increment in pore size (by approx. 10 nm) based on a difference.

Based on the data thus obtained, a pressure under which a flow rate of the wet porous separator is half of a flow rate of the dry porous separator is obtained, and then a pore diameter in such a case is obtained according to the above specified formula, to thereby obtain an average size of the interconnected pores. Furthermore, a variation amount of the interconnected pores can be obtained based on the average interconnected pore size before and after the etching.

For pores in the first laminar region that have apertures on a surface, an average diameter of the apertures is preferably 50 nm to 500 nm, and more preferably 100 nm to 450 nm. Meanwhile, an average diameter of apertures on the other outermost surface of the porous film, on which the first laminar region is not formed, is not particularly limited and is preferably 50 nm to 1200 nm or less. In a case in which the other outermost surface is composed of the second laminar region (in a case in which the second laminar region is the outermost surface), for pores in the second laminar region that have apertures on a surface, an average diameter of the apertures is preferably larger than the average diameter of the apertures on the outermost surface of the first laminar region. In other words, in a case in which the second laminar region is the outermost surface, for pores in the second laminar region that have apertures on a surface, an average diameter of the apertures is preferably larger than the average pore diameter of the first laminar region.

For pores in the second laminar region that have apertures on a surface, an average diameter of the apertures is preferably 1200 nm or less, and more preferably 800 nm or less. There is no particular lower limit for the average diameter of the apertures on the outermost surface in the second laminar region; however, the average diameter is preferably larger than 250 nm, and more preferably larger than 600 nm.

The average diameter of the apertures on the outermost surface of the porous film can be calculated by: observing a plurality of points from above the surface; measuring pore diameters by image analysis or the like; and averaging the diameters.

Any material that is flexible and strong can be used for the porous film with no particular limitation; however, a resin is preferably used in light of easy producibility and cost efficiency. Resins generally used for porous separators may be used with no particular limitation. Examples include at least one kind selected from: a polyolefin resin which is a homopolymer or a copolymer obtained by polymerizing ethylene, propylene, 1-buten, 4-methyl-1-pentene, 1-hexan and the like; a styrene resin such as the polystyrene; an ABS resin; a vinyl chloride resin; a vinyl acetate resin; an acrylic resin; an acrylonitrile resin; a fluorine-containing resin such as polyvinylidene fluoride; celluloses such as cellulose acetate; a heat-resistant resin such as aromatic polyamide, polyimide, polyamideimide, polyethersulfone, polysulfone, polyetherketone, polyetherimide and the like. For example, two or more resins selected therefrom may be used in combination, or each resin may be used in each of different resin layers constituting the porous film.

The polyolefin resin, the styrene resin, the ABS resin, the vinyl chloride resin, the vinyl acetate resin, the acrylic resin, the acrylonitrile resin, and a fluorine-containing resin are thermoplastic resins that melt at the melting start temperature or higher. In order to improve thermal stability of the secondary battery, a heat resistant resin such as aromatic polyamide, polyimide, and polyamideimide is particularly preferably used.

Production Method of Porous Separator for Secondary Batteries

A method for producing the porous film, which forms the porous separator, is not particularly limited, and the film can be produced by, for example: dispersing appropriate resin fine particles or inorganic fine particles in the above specified resin, resin precursor, polymer, polymerizable monomer, or the like; shaping or film-forming with a fine particle dispersed body thus obtained to form a precursor film; and then removing the fine particles contained in the precursor film by an appropriate method. As used herein, a precursor that undergoes a chemical change under heat or the like to give a final resin, such as polyamide acid for polyimide, is referred to as a "resin precursor"; and a film in which fine particles are dispersed in a resin prior to formation of the porous film is referred to as a "precursor film".

The average pore diameter of the porous film can be appropriately adjusted by selecting an average particle diameter of the resin fine particles or the organic fine particles to be dispersed in the precursor film. Here, the relationship of pore diameters specified in the first aspect of the present invention is realized by employing fine particles having different average particle diameters for the respective laminar regions in the precursor film.

The fine particles may be dispersed in the resin, resin precursor, polymer, monomer, or the like by directly blending the fine particles into the resin, resin precursor, polymer, monomer, or the like, or by adding a solvent to the resin, resin precursor, polymer, monomer, or the like in advance and then blending the fine particles. The blending can take place under heat for adjusting viscosity. It should be noted that, in the case of using the solvent, a solvent that does not dissolve the fine particles must be selected.

<Fine Particles>

The material of the fine particles used in the present invention is not particularly limited and may be any known material as long as the material is insoluble in the monomer or the organic solvent used and can be removed later from the precursor film. Examples of the inorganic material include metal oxides such as silica (silicon dioxide), titanium oxide, and alumina ($Al_2O_3$), as well as calcium carbonate. Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers.

The fine particles used in the present invention preferably have a high sphericity (for example 1 to 1.1), in light of ease of formation of the interconnected pores of the porous film. The particle diameter distribution index (d25/d75) is preferably, for example, approximately 1 to 4. Fine particles satisfying these requirements show excellent dispersibility and can be used without causing aggregation with one another.

Fine particles having high sphericity and small particle diameter distribution index are particularly preferably selected as the fine particles used for the first laminar region. For example, the particle diameter distribution index (d25/d75) is preferably 1.5 or less. The fine particles satisfying these requirements can provide pores having uniform pore diameters to the porous film by removing the fine particles and can homogenize the electric field to be applied to the separator.

As another aspect of the present invention, in a case in which the second laminar region has a laminar region having a maximum pore diameter larger than the average diameter of the first laminar region, the particle diameter distribution index (d25/d75) in the second laminar region is preferably greater than the particle diameter distribution index (d25/d75) in the first laminar region, and an absolute value of a difference of the particle diameter distribution index between the laminar regions is preferably 0.5 or more and more preferably 1 to 3.

As the fine particles, those having an average particle diameter (average diameter) of, for example, 100 to 2000 nm can be used. The average particle diameter of the fine particles used in the first laminar region may be 100 nm or more and 500 nm or less, preferably 100 nm or more and 400 nm or less, and more preferably 100 nm or more and 300 nm or less. The average particle diameter of the fine particles used in the second laminar region is not particularly limited, and is preferably 2000 nm or less, preferably 250 nm or more, and more preferably 500 nm or more and 1200 nm or less.

Specifically, the fine particles are preferably, for example, colloidal silica, in particular spherical silica particles. Monodisperse spherical silica particles which can form uniform pores are more preferable.

In the present invention, in order to uniformly disperse the fine particles in the resin, resin precursor, polymer, or monomer, a dispersant may be added along with the fine particles, to the resin, resin precursor, polymer, monomer, or the like; or to a mixture thereof with the solvent. The addition of the dispersant allows further uniform mixing of the resin, resin precursor, polymer, or monomer with the fine particles and further uniform dispersion of the fine particles in the molded or formed precursor film. As a result, densely populated apertures are provided on the surface of the finally formed porous film on which the first laminar region is provided, and the front and rear surfaces can be efficiently communicated with each other to improve the air permeability.

The dispersant used in the present invention is not particularly limited and may be any known one. Examples of the dispersant include, but are not limited to, anionic surfactants such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters such as octyl stearate and trimethylolpropane tridecanoate; and polyether polyols such as polyoxyalkylene butyl ether, polyoxyalkylene oleyl ether, and trimethylol propane tris (polyoxyalkylene) ether. These dispersants may be used as a mixture of two or more thereof.

Production of Precursor Film

A method for producing the precursor film prior to formation of the porous film is described hereinafter by way of example; however, the method for producing the porous film of the present invention is not limited thereto.

In a case in which the porous film of the present invention is formed of the thermoplastic resin such as polyolefin resin, the thermoplastic resin, the fine particles, and the like are mixed by using a roller, a Banbury mixer, a single screw extruder, a double screw extruder, or the like to obtain a thermoplastic resin composition. Upon mixing of the above-mentioned materials, an additive such as a dispersant, an antioxidant, a UV absorber, a fire retardant, fatty acid ester, and a stabilizing agent may further be added as necessary.

A method for producing a precursor film formed of the thermoplastic resin composition is not particularly limited, and a conventionally known sheet forming method such as inflation, calendering, T-die extrusion, and skiving may be employed. In these forming processes, the thermoplastic resin composition may be directly introduced into a corresponding jig or the like by an extruder, or may be pelletized and then introduced into a corresponding jig or the like by an extruder.

The porous film of the present invention can be obtained by removing the fine particles from the precursor film formed of the thermoplastic resin composition. For formation of the two laminar regions with different average pore diameters, films obtained by removing the fine particles from the precursor films may be joined, or the precursor films may be joined to form a composite film and then the fine particles may be removed from the precursor films. By using the thermoplastic resin composition as the precursor films, lamination by thermal press bonding becomes easy. A composite precursor film including two laminar regions may be formed by extrusion and then the fine particles may be removed from the precursor film.

If a resin, a resin precursor, a polymer and the like composing the precursor film dissolve uniformly in an organic solvent, these components may be made into a varnish and then into a film, to obtain the precursor film. For example, in light of heat resistance of a battery, in the case of employing polyimide as a material for the porous film, it is preferable to use a varnish prepared from polyamide acid, which is a resin precursor, or soluble polyimide or polyamide imide.

An example of the production method employing varnish is described hereinafter, mainly in the case of using polyamide acid, or soluble polyimide or polyamide imide. In the case of using other soluble thermoplastic resin, the production method employing varnish can be employed by modifying the production method described below according to the thermoplastic resin being used.

First, a varnish containing polyamide acid or polyimide or polyamide imide, fine particles, and an organic solvent is prepared. The varnish is prepared by mixing an organic solvent in which prescribed fine particles are dispersed in advance with the polyamide acid or polyimide or polyamide imide at an appropriate ratio or by polymerizing the polyamide acid or polyimide or polyamide imide in an organic solvent in which prescribed fine particles are dispersed in advance. The fine particles may be any particles that are insoluble in the organic solvent to be used in the varnishes and can be selectively removed after film formation.

[Polyamide Acid]

The polyamide acid being used may be any one prepared by polymerizing appropriate tetracarboxylic dianhydride and diamine. The amounts of the tetracarboxylic dianhydride and the diamine are not particularly limited, and the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

The diamine can be appropriately selected from diamines that have been conventionally used as raw materials for synthesizing polyamide acids.

The diamine may be an aromatic diamine or an aliphatic diamine, but from the viewpoint of the heat resistance of the resulting polyimide resin, an aromatic diamine is preferred. These diamines may be used in a combination of two or more thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The polyamide acid to be used in the present invention may be produced by any method and, for example, can be produced by a known method, for example, by reacting an acid and a diamine component in an organic solvent.

The reaction of a tetracarboxylic dianhydride and a diamine is usually performed in an organic solvent. The organic solvent to be used for the reaction of a tetracarboxylic dianhydride and a diamine may be any organic solvent that can dissolve the tetracarboxylic dianhydride and the diamine without reacting with the tetracarboxylic dianhydride and the diamine. The organic solvent may be a single solvent or a mixture of two or more solvents.

Examples of the organic solvent to be used for the reaction of a tetracarboxylic dianhydride and a diamine include nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols. These organic solvents may be used alone or as a mixture of two or more thereof. The amount of the organic solvent is not particularly limited but is desirably such that the content of the resulting polyamide acid is 5% to 50% by mass.

Among these organic solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition and is usually 3 to 24 hours (hr). The organic solvent solution of the polyamide acid prepared under such conditions preferably has an intrinsic viscosity of 1000 to 100000 centipoises (cP), more preferably in a range of 5000 to 70000 cP.

<Polyimide>

The polyimide used in the present invention can be any known polyimide, without restricted by its structure and molecular weight, as long as the polyimide is soluble in the organic solvent to be used in the varnish of the present invention. The side chain of the polyimide may have a condensable functional group, such as a carboxy group, or a functional group enhancing the cross-linking reaction during calcining.

In order to make the polyimide soluble in an organic solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in an organic solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility.

<Polyamide Imide>

The polyamide imide used in the present invention can be any known polyamide imide, without restriction by its structure and molecular weight, as long as the polyamide imide is soluble in the organic solvent to be used in the varnish according to the present invention. The side chain of the polyamide imide may have a condensable functional group, such as a carboxy group, or a functional group enhancing a cross-linking reaction etc. during calcination.

In addition, as the polyamide imide used in the present invention, polyamide imide obtained by reacting any trimellitic anhydride with diisocyanate, and polyamide imide obtained by imidizing a precursor polymer obtained as a result of reaction of a reactive derivative of any trimellitic anhydride with diamine can be used without particular limitation.

As the above mentioned any trimellitic anhydride or reactive derivative thereof, for example: trimellitic anhydride; trimellitic anhydride halides such as trimellitic anhydride chloride; trimellitic anhydride esters; and the like can be exemplified.

As the above mentioned any diisocyanate, for example, meta-phenylene diisocyanate, p-phenylene diisocyanate, o-tolidine diisocyanate, p-phenylene diisocyanate, m-phenylene diisocyanate, 4,4'-oxybis (phenyl isocyanate), 4,4'-diphenylmethane diisocyanate, bis[4-(4-isocyanate phenoxy) phenyl] sulfone, 2,2'-bis[4-(4-isocyanate phenoxy) phenyl] propane, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, isophorone diisocyanate, hexamethylene diisocyanate, 4,4'-dicyclohexyl methane diisocyanate, m-xylene diisocyanate, p-xylene diisocyanate, naphtalen diisocyanate, and the like can be exemplified.

As the above mentioned any diamine, those exemplified above in the description with regard to the polyamide acid can be exemplified.

The organic solvent used in the varnish is not particularly limited as long as the solvent can dissolve polyamide imide while not dissolving the fine particles; and can include those exemplified as the solvent used for reaction of tetracarboxylic dianhydride with diamine. The solvent can be used alone or in a combination of two or more types.

The content of the organic solvent in all components of the varnish is preferably 50 to 95% by mass, and more preferably 60 to 85% by mass. The solid content concentration of the varnish is preferably 5 to 50% by mass, and more preferably 15 to 40% by mass.

<Varnish>

The varnish of the present invention can be produced by mixing a polyamide acid or polyimide with an organic solvent in which fine particles are dispersed in advance at an appropriate ratio, or by polymerizing a tetracarboxylic dianhydride and a diamine into a polyamide acid in an organic solvent in which fine particles are dispersed in advance, or by further performing imidization into a polyimide. The final viscosity thereof is preferably adjusted to 300 to 1500 cP and more preferably in a range of 400 to 700 cP. The varnish having a viscosity within this range can be formed into a uniform film.

For production of the porous separator for secondary batteries according to the first aspect of the present invention, at least two varnishes containing fine particles having different particle diameters are prepared in advance. One of the varnishes contains fine particles having an average particle diameter of 100 nm or more and 500 nm or less, and is referred to as a "first varnish". The other varnish contains fine particles having an average particle diameter greater than that of the first varnish, and is referred to as a "second varnish".

Volume ratios (of components constituting the porous film or the precursor film (resin, resin precursor, polymer, etc.) to the fine particles) of the first varnish and the second varnish may be the same or different. With (A) being the components constituting the porous film or the precursor film and (B) being the fine particle, a volume ratio of (A) to (B) is preferably in a range of 15:85 to 50:50, and more preferably 19:81 to 40:60. It should be noted that in the present Specification values for percent by volume and volume ratios are values at 25° C.

In the case of using varnishes having different volume ratios, it is preferable that a proportion of the fine particles is higher in the volume ratio of the first varnish. As with (A) and (B), with (A1) and (B1) being the components of the first varnish and (A2) and (B2) being the components of the second varnish, a volume ratio of (A1) to (B1) is preferably 15:85 to 45:65, and more preferably 19:81 to 45:65. A volume ratio of (A2) to (B2) is preferably 20:80 to 50:50.

A composite film containing polyamide acid or polyimide or polyamide imide and the fine particles can be formed by: applying the varnish on a substrate; and removing the organic solvent by drying at 0 to 50° C. under ordinary pressure or under vacuum, or at 10 to 30° C. under ordinary pressure. Hereinafter, the film formed of the first varnish is referred to as a "first uncalcined composite film" and the film formed of the second varnish is referred to as a "second uncalcined composite film".

For example, the first varnish is applied onto a substrate, such as a glass substrate, directly or with a mold release layer provided in advance and is then dried to form the first uncalcined composite film. And then the second varnish is applied onto the first uncalcined composite film and is then dried in a similar manner to form the second uncalcined composite film.

Thereafter, the uncalcined composite film composed of the first uncalcined composite film and the second uncalcined composite film is calcined to obtain the precursor film prior to formation of the porous film. The calcination may take place in a state in which the uncalcined composite film is formed on the substrate or the uncalcined composite film has been separated from the substrate in advance. The calcination temperature varies depending on the structure of the uncalcined composite film and the presence or absence of a condensing agent and is preferably 120° C. to 375° C. and more preferably 150° C. to 350° C.

In a case of using an organic material for the fine particles, the calcining temperature must be set to a temperature lower than the thermal decomposition temperature of the organic material. It is preferable that imidization is completed In the calcining step. In a case in which polyamide or polyamide imide is used in the varnish, the calcining step may be omitted.

The calcination may be performed by, for example, a method of increasing the temperature from room temperature to 375° C. over 3 hours and then holding 375° C. for 20 minutes or a method of stepwise drying-thermal imidization by stepwise increasing the temperature by 50° C. from room temperature to 375° C. (holding the temperature of each step for 20 minutes) and finally holding 375° C. for 20 minutes.

When the uncalcined composite film is peeled from the substrate once, an end of the uncalcined composite film may be fixed to, for example, a frame made of SUS stainless steel to prevent deformation.

<Porosification of Precursor Film (Fine Particle-Removing Step)>

The porous film of the present invention can be produced with high reproducibility by selecting an appropriate method for removing the fine particles from the precursor film obtained above.

The inorganic fine particles can be dissolved and removed by processing the precursor film with a low-concentration hydrogen fluoride solution or the like in the case of silica being employed, and with hydrochloric acid in the case of calcium carbonate being employed.

Alternatively, an organic material may also be selected as the material of the fine particles. The fine particles can be removed by processing the precursor film with an organic solvent that dissolves only the fine particles without dissolving the resin constituting the porous film, or that decomposes the fine particles. In the latter case, any organic material, which is decomposed at a temperature lower than the resin and the like constituting the porous film, may be used with no particular limitation. Examples of the fine particles include resin particulates composed of linear polymers and known depolymerizable polymers. The linear polymer usually has a molecular chain that is randomly cleaved during thermal decomposition; and the depolymerizable polymer is decomposed into a monomer during thermal decomposition. Both are decomposed into a low molecular weight substance or to $CO_2$ and disappear from the precursor film to form pores. Since the resin fine particles to be used often have a decomposition temperature of 200° C. to 320° C., polyimide or polyamide imide is preferably employed as the resin constituting the porous film.

Prior to removal of the fine particles, at least a part of a resin portion of both or one of the two principal surfaces of the precursor film may be removed. Alternatively, a step of removing at least a part of the resin portion of both or one of the two principal surfaces of the precursor film may be provided following removal of the fine particles.

By removing at least a part of a resin portion of both or one of the two principal surfaces of the precursor film by any one of the abovementioned methods, the aperture ratio of the porous film as a final product can be increased, compared to a case of not removing. In the case of the removing step following the removal of the fine particles, the average aperture diameter is increased along with the aperture ratio. The removing step can be performed by employing a conventionally known chemical etching method or a physical method.

As the chemical etching method, a treatment with chemical etching solution such as inorganic alkali solution or organic alkali solution can be exemplified. The chemical etching method can effectively interconnect the front and rear surfaces and improve air permeability. The inorganic alkali solution is preferable. As the inorganic alkali solution: hydrazine solution containing hydrazine hydrate and ethylenediamine; solution of alkali metal hydroxides such as potassium hydroxide, sodium hydroxide, sodium carbonate, sodium silicate, sodium metasilicate; ammonia solution; etching solution composed primarily of hydroxylation alkali, hydrazine and 1,3-dimethyl-2-imidazolidinone can be exemplified. As the organic alkali solution: primary amines such as ethylamine and n-propylamine; secondary amines such as diethylamine and di-n-butylamine; tertiary amines such as triethylamine and methyldiethylamine; alcohol amines such as dimethylethanolamine and triethanolamine; quaternary ammonium salts such as tetramethylammonium hydroxide and tetraethylammonium hydroxide; and alkaline solution of cyclic amines such as pyrrol and piperidine, can be exemplified.

Pure water and alcohols can be selected as appropriate as a solvent for the above mentioned solutions. A solution with an appropriate amount of surfactant can also be used. Alkali concentration is for example 0.01 to 20% by mass.

As the physical method, for example: dry etching by plasma (oxygen, argon, etc.), corona discharge and the like; and a method of dispersing abrasives (e.g., alumina (hardness 9)) in liquid and spraying onto a surface of the film at a rate of 30 to 100 m/s to treat the surface of the film can be employed.

The porous film of the present invention can be used as the separator for a secondary battery, such as a nickel cadmium or nickel hydrogen battery or a lithium ion secondary battery and is particularly preferably used as the porous separator for a lithium ion secondary battery.

[Secondary Battery]

The secondary battery of the present invention is characterized in that: an electrolytic solution and the porous separator for secondary batteries according to the first aspect of the present invention are disposed between a negative electrode and a positive electrode; and the first laminar region of the porous separator for secondary batteries is disposed in the negative electrode side.

The secondary battery of the present invention may be of any type and may have any configuration. The present invention can be employed with no particular limitation in known secondary batteries such as nickel cadmium and nickel hydrogen batteries as well as a lithium ion secondary battery, as long as the battery has a configuration in which a battery element including a positive electrode, a separator, and a negative electrode being laminated in this order so as to satisfy the above-described requirements is impregnated with an electrolytic solution and encapsulated in an outer package.

The negative electrode of the secondary battery of the present invention may have a structure in which a negative electrode mixture composed of a negative electrode active material, a conductive auxiliary agent, and a binder is formed on a collector. For example, as the negative electrode active material, cadmium hydroxide can be used in nickel cadmium batteries, and a hydrogen-occlusion alloy can be used in nickel hydrogen batteries. In lithium ion secondary batteries, a material that can be electrochemically doped with lithium can be employed. Examples of such active materials include carbon materials, silicon, aluminum, tin, and Wood's metal.

Examples of the conductive auxiliary agent constituting the negative electrode include carbon materials such as acetylene black and Ketjen black. The binder is composed of an organic polymer, and examples thereof include polyvinylidene fluoride and carboxymethyl cellulose. The collector can be, for example, copper foil, stainless steel foil, or nickel foil.

The positive electrode may have a structure in which a positive electrode mixture composed of a positive electrode active material, a conductive auxiliary agent, and a binder is formed on a collector. For example, the positive electrode active material can be nickel hydroxide in nickel cadmium batteries and can be nickel hydroxide or nickel oxyhydroxide in nickel hydrogen batteries. Meanwhile, in lithium ion secondary batteries, examples of the positive electrode active material include lithium-containing transition metal oxides, specifically, $LiCoO_2$, $LiNiO_2$, $LiMn_{0.55}Ni_{0.55}O_2$, $LiCo_{1/3}Ni_{1/3}Mn_{1/3}O_2$, $LiNn_2O_4$, $LiFePO_4$, $LiCo_{0.55}Ni_{0.5}O_2$, and $LiAl_{0.25}Ni_{0.75}O_2$. Examples of the conductive auxiliary agent include carbon materials such as acetylene black and Ketjen black. The binder is an organic polymer, and examples thereof include polyvinylidene fluoride. The collector can be, for example, aluminum foil, stainless steel foil, or titanium foil.

The electrolytic solution in, for example, a nickel cadmium battery or a nickel hydrogen battery is a potassium hydroxide solution. The electrolytic solution in a lithium ion secondary battery is composed by dissolving a lithium salt in a non-aqueous solvent. Examples of the lithium salt include $LiPF_6$, $LiBF_4$ and $LiClO_4$. Examples of the non-aqueous solvent include propylene carbonate, ethylene carbonate, dimethyl carbonate, diethyl carbonate, ethyl methyl carbonate, y-butyrolactone, and vinylene carbonate. These solvents may be used alone or as a mixture.

Examples of the outer package material include metal cans and aluminum laminate packs. The shape of the battery is, for example, a rectangular shape, a cylindrical shape, or a coin shape; however, the porous separator of the present invention can be suitably applied to any shape.

The pores on the porous separator facing the negative electrode side of the battery preferably have small diameters without variation in size and are preferably arranged densely to prevent charge concentration. Accordingly, when the first laminar region of the porous separator is oriented to the negative electrode side of a secondary battery, the dendrite growth of the metal from the negative electrode side due to repeated use of the secondary battery can be suppressed compared to other cases. This is preferable since the cycle characteristics of the secondary battery are improved.

EXAMPLES

The present invention will now be more specifically described with reference to Examples, but the scope of the present invention is not limited to the following examples.

In Examples and Comparative Examples, tetracarboxylic dianhydride, diamine, polyamide imide, dispersant, organic solvent, and fine particles described below were used.

Tetracarboxylic dianhydride: pyromellitic acid dianhydride
Diamine: 4,4'-diaminodiphenylether
Polyamide imide: polyamide containing trimellitic anhydride and o-tolidine diisocyanate as polymerization components (Mw: approx. 30,000)
Dispersant: polyoxyethylene dialkyl ether-based dispersant
Organic solvent (1): N,N-dimethylacetamide
Organic solvent (2): N-methyl-2-pyrrolidone
Silica: silica having an average particle diameter of 300 nm, 700 nm, 1000 nm

Example 1

[Preparation of Varnish—1]
(1) First Varnish 6.5 g of tetracarboxylic dianhydride, 6.7 g of diamine, and 30 g of the organic solvent (1) were put into a separable flask equipped with a stirrer, a stirring blade, a reflux condenser, and a nitrogen gas inlet tube. Nitrogen was introduced into the flask through the nitrogen gas introduction tube and a nitrogen atmosphere was provided in the flask. Subsequently, the tetracarboxylic dianhydride and the diamine were reacted at 50° C. for 20 hours by stirring the contents of the flask to prepare a polyamide acid solution. To the resulting polyamide acid solution, 75 g of silica having an average particle diameter of 300 nm was added such that a volume ratio between the polyamide acid and the fine particles was 22:78 (mass ratio is 15:85), followed by stirring to prepare a first varnish. The total content of the organic solvents in the varnish was adjusted to 70% by mass.

(2) Second Varnish

A second varnish at a volume ratio between the polyamide acid and the fine particles of 28:72 (mass ratio: 20:80) was prepared as in (1), except that 53 g of silica having an average particle diameter of 700 nm was added to the resulting polyamide acid solution.

[Formation of Precursor Film (Polyimide-Fine Particle Composite Film)]

The first varnish prepared in Preparation of varnish—1 was formed into a film on a glass plate with a release agent being applied, by using an applicator. This layer (approx. 1 μm) composes the first laminar region. Thereafter, the second varnish prepared in Preparation of varnish—1 was formed into a film on the first laminar region by using an applicator. This layer composes the second laminar region. An uncalcined composite film having a thickness of 20 μm was produced by pre-baking at 70° C. for 5 minutes.

The uncalcined composite film was peeled off from the substrate, the release agent was then removed with ethanol, and a heat treatment was performed at 320° C. for 15 minutes to complete imidization and obtain a precursor film (polyimide-fine particle composite film).

[Formation of Porous Film (Porous Polyimide Film)]

The precursor film (polyimide-fine particle composite film) was immersed in a 10% HF solution for 10 minutes to remove the fine particles contained in the film. Permeability of the precursor film thus obtained was 63 seconds.

[Chemical Etching]

Alkaline etching solution was prepared by diluting a 2.38% by mass aqueous solution of tetraalkylammonium hydroxide (TMAH) with 50% by mass aqueous solution of methanol, to 1.04%. A part of the polyimide surface was removed by immersing the porous polyimide film in this etching solution.

Example 2

A porous film was formed as in Example 1 except that the varnish was prepared by using the dispersant in an amount of 10 parts by weight based on 100 parts by weight of silica.

Example 3

A porous film was formed as in Example 1 except for omitting the chemical etching.

Example 4

A porous film was formed as in Example 3 except that the varnish was prepared by using the dispersant in an amount of 10 parts by weight based on 100 parts by weight of silica.

Example 5

A porous film was formed as in Example 1 except that the volume ratio between the polyamide acid and the fine particles of the second varnish was adjusted to 22:78 (mass ratio: 15:85).

Example 6

[Preparation of Varnish—2]
(1) First Varnish

A first varnish (2) was prepared by mixing: 15 parts by mass of polyamide imide; 85 parts by mass of silica having an average particle diameter of 300 nm; a dispersant (0.5% by mass with respect to silica); and the organic solvents (1) and (2), and agitating. The total content of the organic solvents in the varnish was adjusted to 70% by mass, while the mass ratio of the solvents (1):(2) was 30:70. A volume ratio of the polyamide imide to the silica in the first varnish (2) was approximately 22:78.

(2) Second Varnish

A second varnish (2) was prepared by mixing: 20 parts by mass of polyamide imide; 80 parts by mass of silica having an average particle diameter of 700 nm; a dispersant (0.5% by mass with respect to silica); and the organic solvents (1) and (2), and agitating. The total content of the organic solvents in the varnish was adjusted to 70% by mass, while the mass ratio of the solvents (1):(2) was 30:70. A volume ratio of the polyamide imide to the silica in the second varnish (2) was approximately 28:72.

[Formation of Polyamide Imide-Fine Particle Composite Film]

A film of the first varnish (2) prepared in Preparation of varnish—2 was formed on a PET film by using an applicator. This layer (approx. 1 μm) composes the first laminar region. Thereafter, the second varnish (2) prepared in Preparation of varnish—2 was formed into a film on the first laminar region by using an applicator. This layer composes the second laminar region. Prebaking was conducted at 70° C. for 5 minutes, followed by thermal treatment at 280° C. for 15 minutes, to form a polyamide imide-fine particles composite film having a film thickness of approx. 20 μm.

[Formation of Porous Film (Porous Polyamide Imide Film)]

The polyamide imide-fine particle composite film thus obtained was immersed in 10% HF solution for 10 minutes to remove the fine particles contained in the film, washed with water and dried, to obtain a porous polyamide imide film.

Comparative Example 1

A porous film was formed as in Example 1 except for forming a single layer precursor film only with the second varnish prepared in Preparation of varnish—1 and omitting the chemical etching. The average particle diameters on the front and rear surfaces of the porous film were the same. The resulting porous film was very fragile and had poor handleability.

Comparative Example 2

A porous film was formed as in Comparative Example 1 except that the first varnish prepared in Preparation of varnish—1 was used.

Comparative Example 3

A porous film was formed as in Comparative Example 1 except for conducting the chemical etching under the same conditions as those in Example 1.

Comparative Example 4

A porous film was formed as in Example 1 except that silica having the average particle diameter of 700 nm was added to the first varnish prepared in Preparation of silica—1, and silica having the average particle diameter of 1000 nm was added to the second varnish prepared in Preparation of silica—1.

The film characteristics of the porous films (porous polyimide films) thus prepared were evaluated, and the results are summarized in Table 1.

[Air Permeability]

A 5 cm×5 cm sample was cut out of the porous film of approx. 25 μm in thickness (with the first laminar region of 1 μm). The time for 100 mL of air passing through the sample was measured with a Gurley densometer (manufactured by Toyo Seiki Co., Ltd.) in accordance with JIS P 8117.

[Tensile Strength]

In order to evaluate the strength of the porous film, the tensile strength of the porous film was measured.

The porous films of Examples 1 to 5 and Comparative Examples 1 to 5 were each cut into a 1 cm×5 cm strip sample. The stress (MPa) at the time when this sample was broken was evaluated with RTC-1210A TENSILON (manufactured by ORIENTEC Co., Ltd.).

[Average Pore Diameter]

In Table 1, average pore diameters of the samples with no chemical etching are average particle diameters of the fine particles used. For the samples with chemical etching, an actual average pore diameter was obtained based on average size variation of interconnected pores after the chemical etching obtained by a porometer.

[Aperture Diameter]

An aperture diameter was obtained by image analysis of an aerial SEM image.

TABLE 1

| | Dispersant | Chemical etching | First laminar region Average pore diameter (nm) | Second laminar region Average pore diameter (nm) | Film thickness (μm) | Air permeability (sec) | Aperture diameter in first laminar region (nm) | Aperture diameter in second laminar region (nm) | Tensile stress (MPa) |
|---|---|---|---|---|---|---|---|---|---|
| Example 1 | No | Yes | 350 | 750 | 20 | 63 | 350 | 750 | 7 or more |
| Example 2 | Yes | Yes | 350 | 750 | 20 | 60 | 350 | 750 | 7 or more |
| Example 3 | No | No | 300 | 700 | 20 | 160 | 260 | 660 | 7 or more |
| Example 4 | Yes | No | 300 | 700 | 20 | 45 | 260 | 660 | 7 or more |
| Example 5 | No | Yes | 350 | 750 | 20 | 45 | 350 | 750 | 7 or more |
| Comparative Example 1 | No | No | 700 | 700 | 20 | 160 | 660 | 660 | Less than 1 |
| Comparative Example 2 | No | No | 300 | 300 | 20 | 16 | 260 | 260 | 7 or more |
| Comparative Example 3 | No | Yes | 750 | 750 | 20 | 200 | 750 | 750 | 7 or more |
| Comparative Example 4 | Yes | No | 700 | 1000 | 20 | 160 | 660 | 960 | 7 or more |

The porous film of Comparative Example 1, in which the average pore diameters of the first and second laminar regions are large, showed low air permeability and also reduced film strength to make handling difficult. The porous film of Comparative Example 2, in which the average pore diameters of the first and second laminar regions are reduced, showed low air permeability and improved film strength allowing easy handling.

The maximum diameter of the second laminar region was approx. 2000 nm in Examples 1 to 7 and Comparative Examples 1, 3 and 4. The maximum diameter of the second laminar region was approx. 300 nm in Comparative Example 2.

On the other hand, the porous film of Examples 1 to 6, in which the average pore diameters of the first and second laminar regions are configured to satisfy the conditions of the present invention, showed improved film strength and superior handleablility in spite of the second laminar region having a large average pore diameter, and air permeability fell between that of Comparative Example 1 with a large average pore diameter and that of Comparative Example 2 with a small average pore diameter. Comparison of the film of Example 4 using the dispersant to the film of Example 3 not using the dispersant demonstrates that the air permeability of Example 4 using a dispersant was superior, being improved to a similar level to Example 1 with chemical etching.

<Production of Coin Battery for Evaluation>

In coin outer container made of stainless steel and having a diameter of 20 mm, a carbon negative electrode, a separator of Examples 1 to 5 and Comparative Example 1 to 4 cut into a circle having a diameter of 14 mm, metal lithium cut into a circle having a diameter of 14 mm, and a spacer of copper foil cut into a circle having a diameter of 14 mm and a thickness of 200 μm were stacked in this order; several drops of an electrolytic solution (1 mol·dm$^{-3}$ of LiPF$_6$: a solution mixture of ethylene carbonate/diethyl carbonate=1/1 (volume ratio)) were added to the container so as not to overflow from the container; and the container was capped with a stainless steel cap via polypropylene packing and was sealed with a caulking tool for producing coin batteries to produce a battery for evaluating a separator. On the occasion of the production, the separator was used such that the side produced by using the first varnish was in contact with the negative electrode. The resulting respective batteries were used as Examples B1 to B5 and Comparative Examples B1 to B4.

<Evaluation of Charge-Discharge Characteristics of Coin Battery>

The charge-discharge characteristics were evaluated by charging each coin battery for evaluation at a current density of 2.2 mAh (1C) up to 4.1 V (CC-CV operation) and then discharging the battery at a current density of 2.2 mAh (1C) or 3C down to 2.5 V (CC operation), in a thermostatic chamber. Table 2 shows the results. In Table 1, the values shown in parentheses are the electrostatic capacity retention ratios (%) at a rate of 3C when the capacity at 1C is defined as 100%.

<Production of Monolayer Laminate Cell Battery for Evaluation

A positive electrode of 20 mm×20 mm and a separator of 20 mm×20 mm of the respective above-described Examples were placed in an aluminum laminate outer container in this order, and an electrolytic solution (solvent:ethylene carbonate:ethyl methyl carbonate=3:7, electrolyte salt:LiPF$_6$ 1 mol/L) was added thereto. A negative electrode of 20 mm×20 mm was placed in the container, and the battery case was sealed to obtain lithium ion secondary batteries of Examples B1 to B4 as well as Comparative Examples B1 to B4.

Here, the electrodes were a nickel-cobalt-manganese ternary positive electrode and an artificial graphite negative electrode, and were arranged such that the first layer was in contact with the negative electrode.

Furthermore, monolayer laminate cell batteries were prepared similarly to the above, except that a commercially available polyethylene-based (PE-based) or cellulose-based separator was used. These are used as Comparative Examples B5 and B6. The PE-based separator being used had an average pore diameter of 80 nm, a thickness of 20 μm, an air permeability of 270 seconds, and a porosity of 42%; and the cellulose-based separator being used had an average pore diameter of 3000 nm, a thickness of 25 μm, an air permeability of 135 seconds, and a porosity of 70%. These have the same average pore diameter on the front and the rear surfaces.

<Charge-Discharge Characteristics of Monolayer Laminate Cell Battery>

Using the resulting lithium ion secondary battery, the potential change by lithium occlusion was measured with a charge-discharge measuring apparatus. The battery was charged up to 4.2 V at a charging speed of 0.2 C at 25° C., and after a pause of 10 minutes, was then discharged at a discharging speed of 2C down to a voltage range of 2.7 V. After the discharge, a pause of 10 minutes was taken. The battery was evaluated for the Ah utilization rate and the Wh utilization rate (energy retention ratio) during this process.

<Heat Resistance of Separator>

The separator used in each battery was evaluated for the heat resistance using a soldering iron of about 250° C. according to the following criteria:

O: When a tip of the soldering iron is pressed against the center of a film, a mark was left, but the film was not broken.

X: When a tip of the soldering iron is pressed against the center of a film, the film was pierced.

<Crushing Test of Monolayer Laminate Cell Battery>

A crushing test was performed by charging a monolayer laminate cell battery at a voltage of 4.2 V and then compressing the battery in a resting state in the direction vertical to the length direction with a round bar having a diameter of 15.8 mm. The time when the voltage reduced was determined as the occurrence of internal short-circuit of the battery, and the battery was evaluated by the pressure at the time of the occurrence of the internal short-circuit. The amount of reduction in voltage at 5 seconds after the time of the reduction of the voltage was defined as ΔV (V). A higher value of the pressure is preferred, and a lower reduction in voltage is preferred.

<Charge-Discharge Characteristics of Monolayer Laminate Cell Battery: Low Temperature and Increase in Charging Speed>

For the lithium ion secondary batteries produced in Example 1 and Comparative Examples B5 and B6, the potential change due to lithium occlusion was measured by using a charge-discharge measuring apparatus. At a temperature of 0° C. and a charging speed of 1C, an Ah efficiency and a capacity retention ratio at a fifth cycle (ratio to the electric discharge capacity at a first cycle) were obtained under conditions of: charging CCCV: 4.2 V; CV: 1 hour, discharge: 2.7 V. Results are shown in TABLE 3.

<Observation of Negative Electrode Surface After Evaluation of Charge-Discharge Characteristics>

The negative electrode was taken out from the battery after completion of the above described charge-discharge characteristics evaluation test, and a surface thereof was observed. Statuses of dendrite generation on the negative electrode surfaces are shown in Table 3. In addition, the negative electrode surfaces of Example B1, Comparative Example B5 and Comparative Example B6 were enlarged 500 times and observed with an optical microscope. Results are shown in Tables 1 to 3.

TABLE 3

| | | Evaluation result of monolayer laminate cell battery | | |
|---|---|---|---|---|
| | Separator used | Ah efficiency (%) | Capacity retention ratio (%) | Lithium dendrite on negative electrode surface |
| Example B1 | Example 1 | 99.82 | 98.73 | Slight whiteness observed in four corners |
| Comparative Example B5 | PE | 95.36 | 77.69 | Whiteness observed in outer periphery |
| Comparative Example B6 | Cellulose | 99.68 | 98.63 | Whiteness observed in outer periphery |

TABLE 2

| | | Evaluation result of monolayer laminate cell battery | | | | | | |
|---|---|---|---|---|---|---|---|---|
| | | Evaluation result of coin battery | | Ah utilization | Wh utilization | | Crushing test | |
| | | | | | | | | ΔV |
| | Separator used | 1 C (mAh) | 3 C (mAh) | rate (%) vs 0.2 C | rate (%) vs 0.2 C | Heat resistance | Pressure (ton) | (5 seconds later) |
| Example B1 | Example 1 | 2.2 | 1.7 (76.5%) | 88.2 | 84.4 | o | 0.57 | 0.26 |
| Example B2 | Example 2 | 2.2 | 1.7 (75.4%) | 88.1 | 84.2 | o | — | — |
| Example B3 | Example 3 | 2.1 | 1.6 (74.7%) | 88.0 | 84.2 | o | 0.56 | 0.26 |
| Example B4 | Example 4 | 2.2 | 1.7 (75.6%) | 88.1 | 84.3 | o | — | — |
| Example B5 | Example 5 | 2.2 | 1.7 (75.3%) | — | — | o | — | — |
| Comparative Example B1 | Comparative Example 1 | 2 | 1.4 (70.2%) | — | — | o | — | — |
| Comparative Example B2 | Comparative Example 2 | 2.1 | 1.4 (64.3%) | — | — | o | — | — |
| Comparative Example B3 | Comparative Example 3 | 2 | 1.4 (69.8%) | — | — | o | — | — |
| Comparative Example B4 | Comparative Example 4 | 1.9 | 1.3 (69.2%) | — | — | o | — | — |
| Comparative Example B5 | PE | — | — | 83.8 | 78.7 | x | — | — |
| Comparative Example B6 | Cellulose | — | — | 87.6 | 83.9 | o | 0.47 | 0.56 |

The evaluation of the coin batteries showed that lithium ion secondary batteries employing the separator of the Examples of the present invention had superior capacity retention ratio at a high rate and superior electrical characteristics, compared to Comparative Examples B1 to B3, B5 and B6 having the same average pore diameter in the first laminar region in contact with the positive or negative electrode. Meanwhile, Comparative Example B4, in which the average pore diameter of the first laminar region on the negative electrode side of the separator was smaller than the average pore diameter of the second laminar region on the positive electrode side, but the average pore diameter of the negative electrode side surface was as large as exceeding 500 nm, was inferior in electrical characteristics to the battery employing the separator of the Examples of the present invention. In addition, it was confirmed that the battery employing the separator of the present invention was superior in heat resistance and performance in the crushing test to batteries employing commercially available separators.

Figure 2:
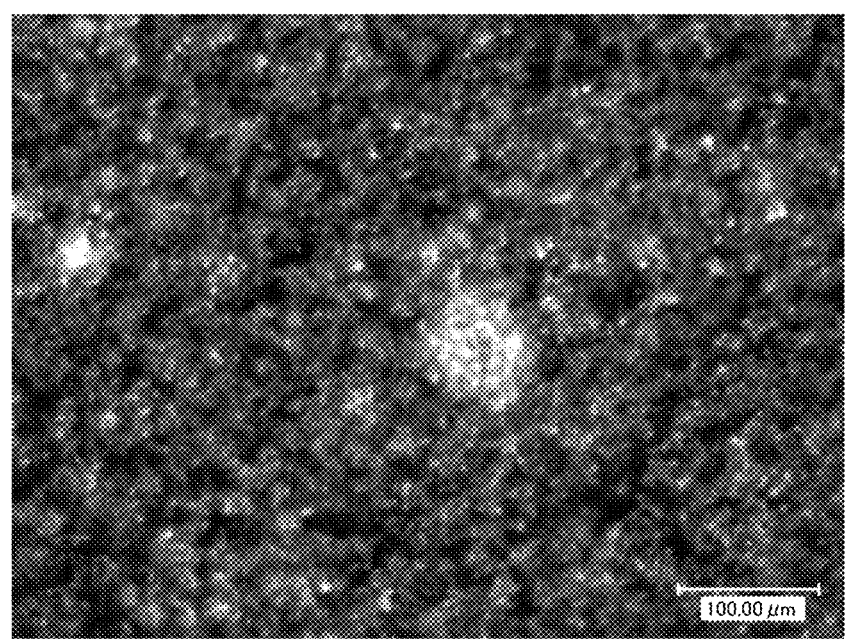
FIG. 2 is a diagram illustrating a negative electrode surface of a secondary battery employing a general-purpose polyethylene (PE) separator, after a charge/discharge test.
Figure 3:
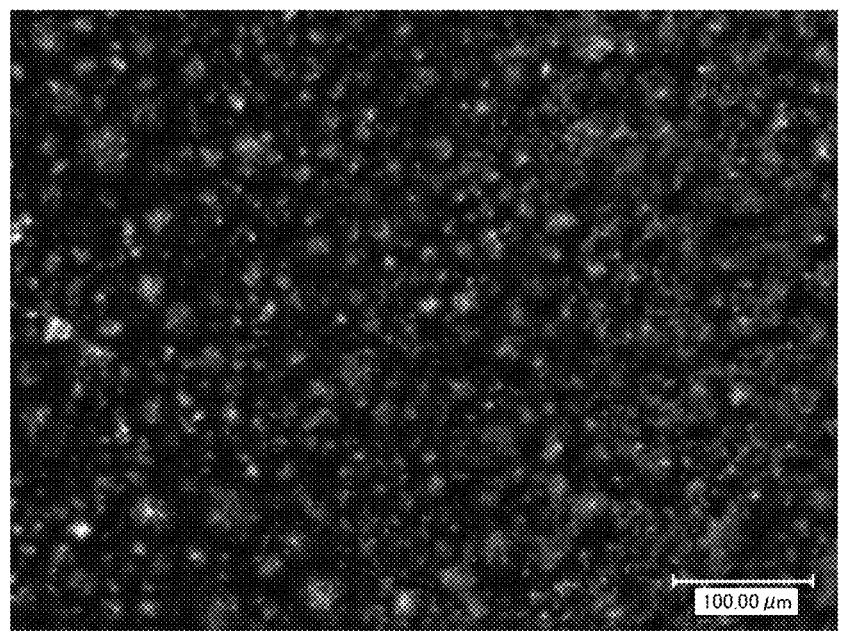
FIG. 3 is a diagram illustrating a negative electrode surface of a secondary battery employing a general-purpose cellulose separator, after a charge/discharge test.

FIGS. 1 to 3 are pictures of surfaces of negative electrodes taken out from batteries of Example B1 and Comparative Examples B5 and B6 after completion of the above described charge-discharge characteristics evaluation test. White bright spots due to generation of lithium dendrite were observed on each of these. FIG. 1 shows that there are only a few bright spots on the negative electrode, indicating that lithium dendrite generation due to change and discharge is effectively suppressed. On the contrary, the bright spots on the negative electrodes taken out from Comparative Examples B5 and B6 are large in size and number. In other words, it can be observed that lithium dendrite generation occurs more frequently in the batteries (Comparative Examples B5 and B6) employing commercially available separators of polyethylene (PE) or cellulose, compared to a case of using the separator of the present invention.

Furthermore, Table 3 and FIGS. 1 to 3 show that the battery employing the separator of Example of the present invention can suppress an amount of lithium dendrite generated on a negative electrode surface and provides a superior capacity retention ratio at low temperature, suggesting that an electrical field applied to the separator is homogenized.

<Production of Coin Battery for Evaluation>

In a coin outer container made of stainless steel and having a diameter of 20 mm, a carbon negative electrode, a separator of Examples 4 and 6 cut into a circle having a diameter of 19 mm, metal lithium cut into a circle having a diameter of 16 mm, and a spacer of copper foil having a thickness of 200 µm cut into a circle having a diameter of 14 mm were stacked in this order; several drops of an electrolytic solution (1 mol·dm$^{-3}$ of LiPF$_6$: a solution mixture of ethylene carbonate/diethyl carbonate=1/1 (volume ratio)) were added to the container so as not to overflow from the container; and the container was capped with a stainless steel cap via polypropylene packing and was sealed with a caulking tool for producing coin batteries, to produce a coin battery. The batteries were used as Examples B6 and B7.

<Evaluation of Charge-Discharge Characteristics of Coin Battery>

The charge-discharge characteristics were evaluated by charging each coin battery for evaluation at a current density of 0.6 mAh (0.2 C) up to 4.2 V (CC-CV operation) and then discharging the battery at a current density of 0.6 mAh (0.2 C) down to 2.7 V (CC operation), in a thermostatic chamber. In the case of the battery of Example B6 employing the separator of Example 2, the electric discharge capacity was 2.82 mAh. On the other hand, in the case of the battery of Example B7 employing the separator of Example 6, the electric discharge capacity was 2.75 mAh, indicating that a similar characteristic to the polyimide porous film can be obtained even in the case of employing a polyamide imide porous film as the separator.

The invention claimed is:

1. A porous separator comprising a porous film, the porous film comprising:
   a first laminar region having an average pore diameter of 100 nm or more and 500 nm or less and a thickness of 0.3 µm or more and 5 µm or less; and
   a second laminar region having an average pore diameter larger than the average pore diameter of the first laminar region,
   wherein the first laminar region is positioned as one outermost surface of the porous film;
   wherein pores in the porous film are defined by outer surfaces of removed spherical fine particles; and
   wherein the porous film comprises at least one selected from the group consisting of aromatic polyamide, polyimide and polyamideimide.

2. The porous separator according to claim 1, wherein the second laminar region is positioned as another outermost surface of the porous film.

3. The porous separator according to claim 1, wherein the average pore diameter of the second laminar region is 1200 nm or less.

4. A secondary battery comprising a negative electrode, a positive electrode, an electrolytic solution and the porous separator according to claim 1,
   wherein the electrolytic solution and the porous separator are disposed between the negative electrode and the positive electrode; and the first laminar region of the porous separator is disposed in a negative electrode side.

5. A method of producing a secondary battery comprising a negative electrode, a positive electrode, an electrolytic solution and the porous separator according to claim 1, the method comprising:
   disposing the electrolytic solution and the porous separator between the negative electrode and the positive electrode; and
   disposing the first laminar region of the porous separator in a negative electrode side.

6. The porous separator according to claim 1, wherein the second laminar region has a thickness of 4.3 µm or more and 500 µm or less.

7. The porous separator according to claim 1,
   wherein a particle diameter distribution index (d25/d75) of the fine particles satisfies at least one of (i) to (iii) below:
   (i) the particle diameter distribution index (d25/d75) of the fine particles in the second laminar region is greater than the particle diameter distribution index (d25/d75) of the fine particles in the first laminar region;
   (ii) the particle diameter distribution index (d25/d75) of the fine particles in the porous film is 1 to 4; and
   (iii) the particle diameter distribution index (d25/d75) of the fine particles in the first laminar region is 1.5 or less.

8. A method of producing the porous separator according to claim 1, the method comprising:
   applying a first varnish comprising fine particles having an average pore diameter of 100 nm or more and 500 nm or less onto a substrate to form a first uncalcined composite film;
   applying a second varnish comprising fine particles having an average pore diameter larger than the average pore diameter of the fine particles contained in the first varnish on the first uncalcined composite film to form a second uncalcined composite film; and
   removing the fine particles from a precursor film comprising the first uncalcined composite film and the second uncalcined composite film to obtain the porous film,
   wherein the first varnish and the second varnish comprise at least one selected from the group consisting of a resin, a resin precursor and a polymer, and an organic solvent.

9. The method according to claim 8, further comprising conducting surface treatment by chemical etching to the porous film.

10. A porous separator comprising a porous film, the porous film comprising:
    a first laminar region having an average pore diameter of 100 nm or more and 500 nm or less; and
    a second laminar region having an average pore diameter larger than the average pore diameter of the first laminar region, wherein, for pores in the first laminar region that have apertures on a surface, an average diameter of the apertures is 50 nm to 500 nm;

wherein, for pores in the second laminar region that have apertures on a surface, an average diameter of the apertures is larger than 250 nm and 1200 nm or less;

wherein the first laminar region is positioned as one outermost surface of the porous film;

wherein the pores in the porous film are defined by outer surfaces of removed spherical fine particles; and wherein the porous film comprises at least one selected from the group consisting of aromatic polyamide, polyimide and polyamideimide.

11. The porous separator according to claim 10, wherein the first laminar region has a thickness of 0.3 μm or more and 5 μm or less.

12. The porous separator according to claim 10, wherein the second laminar region has a thickness of 4.3 μm or more and 500 μm or less.

13. The porous separator according to claim 10, wherein the second laminar region is positioned as another outermost surface of the porous film.

14. The porous separator according to claim 10, wherein the average pore diameter in the second laminar region is 1200 nm or less.

15. The porous separator according to claim 10,
wherein a particle diameter distribution index (d25/d75) of the fine particles satisfies at least one of (i) to (iii) below:
(i) the particle diameter distribution index (d25/d75) of the fine particles in the second laminar region is greater than the particle diameter distribution index (d25/d75) of the fine particles in the first laminar region;
(ii) the particle diameter distribution index (d25/d75) of the fine particles in the porous film is 1 to 4; and
(iii) the particle diameter distribution index (d25/d75) of the fine particles in the first laminar region is 1.5 or less.

16. A method of producing the porous separator according to claim 10, the method comprising:
applying a first varnish comprising fine particles having an average pore diameter of 100 nm or more and 500 nm or less onto a substrate to form a first uncalcined composite film;
applying a second varnish comprising fine particles having an average pore diameter larger than the average pore diameter of the fine particles contained in the first varnish on the first uncalcined composite film to form a second uncalcined composite film; and
removing the fine particles from a precursor film comprising the first uncalcined composite film and the second uncalcined composite film to obtain the porous film,
wherein the first varnish and the second varnish comprise at least one selected from the group consisting of a resin, a resin precursor and a polymer, and an organic solvent.

17. The method according to claim 16, further comprising conducting surface treatment by chemical etching to the porous film.

18. A method of producing a secondary battery comprising a negative electrode, a positive electrode, an electrolytic solution and the porous separator according to claim 10, the method comprising:
disposing the electrolytic solution and the porous separator between the negative electrode and the positive electrode; and
disposing the first laminar region of the porous separator in a negative electrode side.

* * * * *